(12) United States Patent
Takahashi

(10) Patent No.: US 12,187,920 B2
(45) Date of Patent: Jan. 7, 2025

(54) POLISHING AGENT FOR SYNTHETIC QUARTZ GLASS SUBSTRATE AND PRODUCING METHOD FOR POLISHING AGENT, AND METHOD FOR POLISHING SYNTHETIC QUARTZ GLASS SUBSTRATE

(71) Applicant: SHIN-ETSU CHEMICAL CO., LTD., Tokyo (JP)

(72) Inventor: Mitsuhito Takahashi, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 297 days.

(21) Appl. No.: 17/921,407

(22) PCT Filed: Mar. 12, 2021

(86) PCT No.: PCT/JP2021/009942
§ 371 (c)(1),
(2) Date: Oct. 26, 2022

(87) PCT Pub. No.: WO2021/235054
PCT Pub. Date: Nov. 25, 2021

(65) Prior Publication Data
US 2023/0159792 A1   May 25, 2023

(30) Foreign Application Priority Data
May 21, 2020  (JP) ................ 2020-088522

(51) Int. Cl.
*C09G 1/02* (2006.01)
*C03C 15/02* (2006.01)

(52) U.S. Cl.
CPC ........... *C09G 1/02* (2013.01); *C03C 15/02* (2013.01)

(58) Field of Classification Search
CPC .................... C09G 1/02; C03C 15/02
(Continued)

(56) References Cited

U.S. PATENT DOCUMENTS 4,786,325 A * 11/1988 Melard ............. C03C 1/002
106/3
2004/0035153 A1   2/2004 Koike et al.
(Continued)

FOREIGN PATENT DOCUMENTS

CN    101064121 A    10/2007
CN    101970347 A    2/2011
(Continued)

OTHER PUBLICATIONS

Jun. 8, 2021 International Search Report issued in International Application No. PCT/JP2021/009942.
(Continued)

*Primary Examiner* — Anita K Alanko
(74) *Attorney, Agent, or Firm* — Oliff PLC

(57) ABSTRACT

A polishing agent for a synthetic quartz glass substrate including at least: polishing particles; and water, wherein the polishing particles contain: composite oxide particles of cerium and yttrium; and composite amorphous particles of cerium and yttrium, and the composite oxide particles of cerium and yttrium have an average primary particle diameter of 30 nm or more and 80 nm or less, and the composite amorphous particles of cerium and yttrium have an average primary particle diameter of 100 nm or more and 300 nm or less.

8 Claims, 1 Drawing Sheet

(58) Field of Classification Search
USPC .......................................................... 252/79.1
See application file for complete search history.

(56) References Cited

U.S. PATENT DOCUMENTS

| | | | |
|---|---|---|---|
| 2005/0003744 A1* | 1/2005 | Feng .................... | C09K 3/1409 |
| | | | 51/307 |
| 2007/0251270 A1 | 11/2007 | Miyatani et al. | |
| 2008/0311487 A1 | 12/2008 | To et al. | |
| 2011/0045745 A1 | 2/2011 | De Messemaeker et al. | |
| 2015/0232728 A1 | 8/2015 | Takahashi et al. | |
| 2015/0353795 A1 | 12/2015 | Ito et al. | |
| 2016/0194538 A1 | 7/2016 | Mizoguchi et al. | |
| 2016/0272860 A1* | 9/2016 | Mizoguchi ............ | C09K 3/1463 |
| 2019/0119524 A1* | 4/2019 | Takahashi ............ | C09K 3/1436 |
| 2019/0127607 A1 | 5/2019 | Rose et al. | |
| 2020/0024484 A1 | 1/2020 | Takahashi et al. | |
| 2021/0162558 A1* | 6/2021 | Takahashi ............ | C09K 3/1436 |

FOREIGN PATENT DOCUMENTS

| | | |
|---|---|---|
| CN | 102134089 A | 7/2011 |
| CN | 109111854 A | 1/2019 |
| CN | 109722172 A | 5/2019 |
| JP | 863-027389 B2 | 6/1988 |
| JP | 2004-098278 A | 4/2004 |
| JP | 2006-167817 A | 6/2006 |
| JP | 2007-213020 A | 8/2007 |
| JP | 2015-065261 A | 4/2015 |
| JP | 2016-088940 A | 5/2016 |
| JP | 2016-098351 A | 5/2016 |
| JP | 2018-177923 A | 11/2018 |
| JP | 2018-187759 A | 11/2018 |
| JP | 2019-189729 A | 10/2019 |
| TW | 201502261 A | 1/2015 |
| TW | 201506141 A | 2/2015 |
| TW | 201520323 A | 6/2015 |
| WO | 2014038536 A1 | 3/2014 |
| WO | 2017081835 A1 | 5/2017 |
| WO | 2017199491 A1 | 11/2017 |
| WO | 2019207926 A1 | 10/2019 |

OTHER PUBLICATIONS

Nov. 17, 2022 International Preliminary Report on Patentability issued in International Application No. PCT/JP2021/009942.
Apr. 22, 2024 Search Report issued in Chinese Patent Application No. 202180035593.3.

* cited by examiner

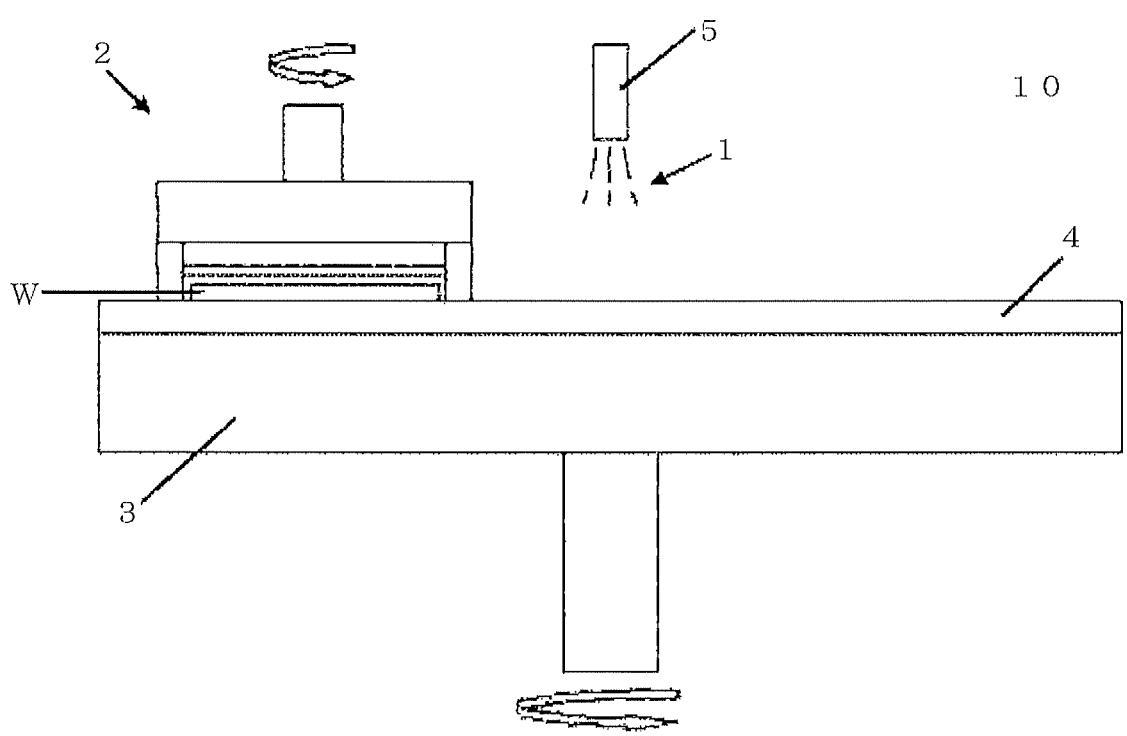

POLISHING AGENT FOR SYNTHETIC QUARTZ GLASS SUBSTRATE AND PRODUCING METHOD FOR POLISHING AGENT, AND METHOD FOR POLISHING SYNTHETIC QUARTZ GLASS SUBSTRATE

TECHNICAL FIELD

The present invention relates to a polishing agent for a synthetic quartz glass substrate and a method for producing the polishing agent, and a method for polishing a synthetic quartz glass substrate.

BACKGROUND ART

In recent years, pattern miniaturization with photolithography have required further stricter qualities of a synthetic quartz glass substrate, such as defect density, defect size, surface roughness, and flatness. Above all, regarding defects on the substrates, higher quality is required as integrated circuits become finer and magnetic media have higher capacity.

From such a viewpoint, on a polishing agent for the synthetic quartz glass substrate, strongly required to improve the quality of the polished quartz glass substrate are small surface roughness of the polished quartz glass substrate and few surface defects, such as scratches, on the surface of the polished quartz glass substrate.

Conventionally, in general, a silica-based polishing agent has been studied as a polishing agent for polishing a synthetic quartz glass. Silica-based slurry is produced by subjecting silica particles to grain growth through thermal decomposition of silicon tetrachloride and adjusting pH with an alkaline solution, which contains no alkali metal such as sodium.

For example, Patent Document 1 describes that use of a highly pure colloidal silica with nearly neutrality can reduce defects.

Patent Document 2 describes that use of a polishing agent containing a colloidal silica having an average primary particle diameter of 60 nm or less and an acid can reduce defects.

Meanwhile, ceria ($CeO_2$) particles, which are known as a strong oxidant and has chemically active property, is more effective to improve a polishing rate of an inorganic insulator, such as glass, than the colloidal silica.

CITATION LIST

Patent Literature

Patent Document 1: JP 2004-98278 A
Patent Document 2: JP 2007-213020 A
Patent Document 3: JP 2006-167817 A
Patent Document 4: JP S63-27389 B

SUMMARY OF INVENTION

Technical Problem

In the invention of using the highly pure colloidal silica with nearly neutrality, described in Patent Document 1, the colloidal silica is unstable near neutrality with considering the isoelectric point of the colloidal silica, and a concerned problem is varying of a particle size distribution of the colloidal silica polishing particles in the polishing agent to fail to achieve stable use. Such a polishing agent is difficult to be circulated and repeatedly used and a fresh agent is to be used, which is economically unpreferable problem.

The polishing agents described in Patent Documents 1 and 2 are insufficient to satisfy the current requirements, and improvement is needed.

As described above, ceria particles are effective to improve a polishing rate of an inorganic insulator, such as glass. However, dry ceria particles used for a common ceria-based polishing agent have an undefined crystalline shape, and has a problem that using the dry ceria particles for the polishing agent is likely to cause defects on the quartz glass substrate surface, such as scratches, compared with spherical colloidal silica. The ceria-based polishing agent also has a problem of poor dispersion stability compared with the colloidal silica to easily precipitate the particles.

When wet ceria particles, which have a polygonal crystalline shape, is used instead of the dry ceria particle as the ceria-based polishing agent for a synthetic quartz glass substrate, the defects such as scratches are reduced compared with the dry ceria particles, but the reduction is insufficient to satisfy the current requirements. Although the defects, such as scratches, can be reduced by reducing a primary particle diameter of the wet ceria particles, reducing the primary particle diameter has a problem of decrease in the polishing rate.

Patent Document 3 describes that use of a polishing agent using a colloidal silica and a polishing agent containing a polymer having a sulfonic acid group, such as acrylic acid/sulfonic acid copolymer, can increase the polishing rate. However, even adding such a polymer into the ceria-based polishing agent is insufficient to satisfy the polishing rate currently required, and further improvement in the polishing rate is required.

Patent Document 4 describes that use of a polishing agent containing 0.5 to 60 mass % of one or more rare-earth elements selected from the group consisting of cerium, lanthanoids, and yttrium can increase the polishing rate. However, the oxide particles obtained by the invention described in Patent Document 4 have an average particle diameter of 0.5 to 1.7 μm, which is a large particle size, and there is a problem of surface precision of the polished synthetic quartz glass substrate.

The present invention has been made to solve the above problems. An object of the present invention is to provide a polishing agent for a synthetic quartz glass substrate that exhibits a high polishing rate and that can sufficiently reduce defect generation due to the polishing.

Solution to Problem

The present invention has been made to achieve the above object. The present invention provides a polishing agent for a synthetic quartz glass substrate, the polishing agent comprising at least: polishing particles; and water, wherein the polishing particles contain: composite oxide particles of cerium and yttrium; and composite amorphous particles of cerium and yttrium, and the composite oxide particles of cerium and yttrium have an average primary particle diameter of 30 nm or more and 80 nm or less, and the composite amorphous particles of cerium and yttrium have an average primary particle diameter of 100 nm or more and 300 nm or less.

Such a polishing agent for a synthetic quartz glass substrate exhibits a high polishing rate against the synthetic quartz glass substrate and enables to sufficiently reduce the defect generation due to the polishing.

In this time, a mixing ratio between the composite oxide particles of cerium and yttrium and the composite amorphous particles of cerium and yttrium in the polishing agent is preferably 1.5 or more and 3.0 or less. The mixing ratio on a mass basis is (a mass of the composite oxide particles of cerium and yttrium)/(a mass of the composite amorphous particles of cerium and yttrium).

The polishing agent for a synthetic quartz glass substrate containing the composite oxide particles of cerium and yttrium and the composite amorphous particles of cerium and yttrium at such a mixing ratio can have further higher polishing ability.

The present invention can also provide a method for producing the above polishing agent for a synthetic quartz glass substrate, the method comprising: a step of producing the composite amorphous particles of cerium and yttrium having an average primary particle diameter of 100 nm or more and 300 nm or less by using at least: a cerium-containing salt and an yttrium-containing salt; and a basic compound at an excess amount relative to the cerium-containing salt and the yttrium-containing salt according to a wet precipitation method for obtaining the composite amorphous particles of cerium and yttrium; a step of producing the composite oxide particles of cerium and yttrium having an average primary particle diameter of 30 nm or more and 80 nm or less by oxidatively treating the composite amorphous particles of cerium and yttrium having an average primary particle diameter of less than 100 nm for obtaining the composite oxide particles of cerium and yttrium; and a step of producing the polishing agent for a synthetic quartz glass substrate by mixing at least: the composite amorphous particles of cerium and yttrium having the average primary particle diameter of 100 nm or more and 300 nm or less; the composite oxide particles of cerium and yttrium having the average primary particle diameter of 30 nm or more and 80 nm or less; and water.

Such a method can produce a polishing agent for a synthetic quartz glass substrate that exhibits a high polishing rate and that can sufficiently reduce the defect generation due to the polishing.

In this time, it is preferably that a nitrate salt of cerium and a nitrate salt of yttrium are used as the cerium-containing salt and the yttrium-containing salt, and urea or a urea-containing compound is used as the basic compound.

This can efficiently precipitate the polishing particles.

The present invention can also provide that a method for polishing a synthetic quartz glass substrate, comprising: a rough polishing step; and a final polishing step after the rough polishing step, wherein in the final polishing step, a final polishing is performed by using the above polishing agent for a synthetic quartz glass substrate.

The above inventive polishing method using the polishing particles for polishing a synthetic quartz glass substrate can inhibit defect generation at a high polishing rate. As a result, a synthetic quartz glass substrate with remarkably fewer defects can be efficiently obtained.

Advantageous Effects of Invention

As described above, the inventive polishing agent for a synthetic quartz glass substrate can yield a high polishing rate and can sufficiently inhibit defect generation on the surface of the synthetic quartz glass substrate. As a result, productivity and yield of the production of the synthetic quartz glass substrate can be improved. In addition, using the inventive polishing agent for a synthetic quartz glass substrate to polish a synthetic quartz glass substrate can yield a synthetic quartz glass substrate with few defects, thereby leading to finer semiconductor devices.

BRIEF DESCRIPTION OF DRAWING

FIG. 1 is a schematic view illustrating an example of a polishing apparatus usable in the inventive method for polishing a synthetic quartz glass substrate.

DESCRIPTION OF EMBODIMENTS

Hereinafter, the present invention will be described in detail, but the present invention is not limited thereto.

In a final polishing of a synthetic quartz glass substrate, silica particles are commonly used. This is because the silica particles, which have a spherical shape and a smooth surface, can yield a surface of a synthetic quartz glass substrate with few defects and high smoothness. The silica particles, however, have low reactivity with glass different from ceria-based particles. Thus, the polishing rate is low, and it is difficult to mention the silica particles as polishing particles having polishing ability.

Although the ceria-based particles, which have a high reactivity with glass, can be used to improve the polishing ability, the ceria-based particles are more likely to generate defects, such as scratches, than the silica particles due to the polishing. Reducing a diameter of the ceria particles can reduce the defects, but reducing the particle diameter also reduce the reactivity with glass to decrease the polishing rate.

As described above, a polishing agent for a synthetic quartz glass substrate that exhibits a high polishing rate and that can sufficiently reduce the defect generation due to the polishing has been required.

The present inventor has earnestly studied the above problem and consequently found that using a mixture containing at least mixed particles of composite oxide particles of cerium and yttrium and composite amorphous particles of cerium and yttrium as polishing particles of a polishing agent for a synthetic quartz glass substrate and reducing an average primary particle diameter of the composite oxide of cerium and yttrium compared with an average primary particle diameter of the composite amorphous particles of cerium and yttrium can inhibit the defect generation due to the polishing. The present inventor also have found that mixing the composite amorphous particles of cerium and yttrium, which can achieve few defects even with a large particle diameter, to inhibit decrease in the polishing rate due to reduced reactivity with glass caused by reducing the particle diameter of the composite oxide of cerium and yttrium can achieve further high polishing rate. The present inventor completed the present invention based on these findings.

In other words, the present inventor have found that a high polishing rate can be achieved and the defect generation due to the polishing can be sufficiently reduced by using a polishing agent for a synthetic quartz glass substrate, the polishing agent comprising at least: polishing particles; and water, wherein the polishing particles contain: composite oxide particles of cerium and yttrium; and composite amorphous particles of cerium and yttrium, the composite oxide particles of cerium and yttrium have an average primary particle diameter of 30 nm or more and 80 nm or less, and the composite amorphous particles of cerium and yttrium have an average primary particle diameter of 100 nm or more and 300 nm or less.

Hereinafter, the present invention will be described with reference to the drawings.

(Polishing Agent for Synthetic Quartz Glass Substrate)

As described above, the polishing particles of the inventive polishing agent for a synthetic quartz glass substrate (hereinafter, also simply referred to as "polishing agent") contain at least: the mixed particles of the composite oxide particles of cerium and yttrium; and the composite amorphous particles of cerium and yttrium.

The inventive polishing agent for a synthetic quartz glass substrate uses the particles in which the composite oxide particles of cerium and yttrium and the composite amorphous particles of cerium and yttrium each having the predetermined average primary particle diameter are mixed as polishing particles. Thus, the inventive polishing agent can inhibit defect generation, such as scratches, due to polishing, and can perform polishing at a high polishing rate.

Hereinafter, each component and optional additive components of the inventive polishing agent for a synthetic quartz glass substrate will be described in more detail.

The inventive composite oxide particles of cerium and yttrium contained in the polishing agent for a synthetic quartz glass substrate have an average primary particle diameter of 30 nm or more and 80 nm or less, and the composite amorphous particles of cerium and yttrium have an average primary particle diameter of 100 nm or more and 300 nm or less. The average primary particle diameter of the composite amorphous particles of cerium and yttrium is larger than the average primary particle diameter of the composite oxide particles of cerium and yttrium.

The composite oxide particles of cerium and yttrium having a smaller particle diameter than the composite amorphous particles of cerium and yttrium allow the composite oxide particles of cerium and yttrium to penetrate in spaces in the filling structure composed of the composite amorphous particles of cerium and yttrium. This configuration can increase the filling rate per unit volume to improve the polishing ability.

As described above, the inventive composite oxide particles of cerium and yttrium have an average primary particle diameter of 30 nm or more and 80 nm or less. The average primary particle diameter is preferably 30 nm or more and 60 nm or less, and particularly preferably 30 nm or more and 50 nm or less. If the average primary particle diameter of the composite oxide particles of cerium and yttrium is less than 30 nm, the reactivity of the composite oxide particles of cerium and yttrium with glass considerably decreases to considerably deteriorate the polishing ability with a quartz glass. If the average primary particle diameter is more than 80 nm, a number of defects, such as scratches, due to the polishing increases and the composite oxide cannot penetrate in the spaces formed with the composite amorphous particles of cerium and yttrium to arise a problem of no improvement of the polishing rate for a quartz glass.

As described above, the inventive composite amorphous particles of cerium and yttrium have an average primary particle diameter of 100 nm or more and 300 nm or less. The average primary particle diameter is preferably 120 nm or more and 250 nm or less, and more preferably 150 nm or more and 200 nm or less. If the average primary particle diameter of the composite amorphous particles of cerium and yttrium is less than 100 nm, the polishing ability of the composite amorphous particles of cerium and yttrium themselves is not improved to decrease the polishing rate. If the average primary particle diameter is more than 300 nm, the dispersibility of the composite amorphous particles of cerium and yttrium is deteriorated to arise a problem of precipitating the particles.

In the present invention, the particles are photographed with a magnification so that a TEM observation image includes approximately 50 to 100 observed particles, and an area of one particle extracted by image processing is calculated for calculating a circle-equivalent diameter from this area to specify this diameter as the primary particle diameter (circle-equivalent diameter). A primary particle diameter of each particle observed in the photographed TEM observation image is calculated, and an averaged diameters is specified as the average primary particle diameter.

In the present invention, a mixing ratio (content) on a mass basis between the composite oxide particles of cerium and yttrium and the composite amorphous particles of cerium and yttrium is represented by (a mass of the composite oxide particles of cerium and yttrium)/(a mass of the composite amorphous particles of cerium and yttrium). The inventive polishing agent preferably has mixing ratio of 1.0 or more and 4.0 or less, more preferably 1.5 or more and 3.0 or less. When the mixing ratio is 1.0 or more, the decrease in the polishing rate with the quartz glass can be more effectively inhibited, and thus, the polishing ability can be further improved. When the mixing ratio is 1.5 or more, the polishing ability can be further more improved. When the mixing ratio is 4.0 or less, the composite oxide particles of cerium and yttrium, which are smaller particles, are not dominant, and thereby higher polishing ability can be achieved. When the mixing ratio is 3.0 or less, the polishing ability can be further improved.

Furthermore, a total content (mass) of the composite oxide particles of cerium and yttrium and the composite amorphous particles of cerium and yttrium is preferably 20 parts by mass or more and 50 parts by mass or less relative to 100 parts by mass of the polishing agent. Within this range, the decrease in the polishing rate can be more certainly inhibited.

The inventive polishing agent can contain additives for a purpose of regulating the polishing characteristics. As such additives, anionic surfactants or amino acids that can convert the surface potential of the polishing particles to be negative can be contained, for example. The ceria particles having the negative surface potential are easily dispersed in the polishing agent, thereby secondary particle having a large particle diameter are hardly generated, and the generation of polishing scratches can be further inhibited.

Examples of the anionic surfactants as such additives include monoalkyl sulfate salts, alkylpolyoxyethylene sulfate salts, alkylbenzenesulfonate salts, monoalkylphosphate salts, laurylsulfate salts, polycarboxylate salts, polyacrylate salts, and polymethacrylate salts. Examples of the amino acids include arginine, lysine, aspartic acid, glutamic acid, asparagine, glutamine, histidine, proline, tyrosine, serine, tryptophan, threonine, glycine, alanine, methionine, cysteine, phenylalanine, leucine, valine, and isoleucine. When these additives are used, the concentration thereof is not particularly limited, but the additives are preferably contained within a range of 0.001 part by mass or more and 0.05 parts by mass or less relative to 1 part by mass of the polishing particles. The additives are more preferably contained within a range of 0.005 parts by mass or more and 0.02 parts by mass or less. When the content of the additives is 0.001 part by mass or more relative to 1 part by mass of the polishing particles, the mixed particles are more stably dispersed in the polishing agent to more effectively inhibit the formation of aggregated particles having a large particle diameter. When the content of the additives is 0.05 parts by mass or less relative to 1 part by mass of the polishing particles, inhibition of polishing by the additive can be more effectively inhibited to more effectively prevent the decrease in the polishing rate. Therefore, the additives contained within the above range can further improve the dispersion stability of the polishing agent and can further effectively prevent the decrease in the polishing rate.

A pH of the inventive polishing agent is not particularly limited, but preferably within a range of 3.0 or higher and 8.0 or lower in terms of storage stability or excellent polishing rate of the polishing agent. When the pH is 3.0 or higher, the polishing particles are more stably dispersed in the polishing agent. When the pH is 8.0 or lower, the polishing rate can be further improved. The pH is more preferably 4.0 or higher, and particularly preferably 6.0 or higher. The pH is more preferably 7.0 or lower. The pH of the polishing agent can be regulated by adding: inorganic acids, such as hydrochloric acid, nitric acid, sulfuric acid, and phosphoric acid; organic acids, such as formic acid, acetic acid, citric acid, and oxalic acid; and ammonia, sodium hydroxide, potassium hydroxide, and tetramethylammonium hydroxide (TMAH).

(Method for Producing Polishing Agent for Synthetic Quartz Glass Substrate)

The inventive polishing particles are particles produced according to a wet precipitation method of mixing and heat-treating a solution in which rare-earth salts, such as a cerium salt and an yttrium salt, is dissolved in water and a basic solution in which an excess amount of a basic compound in water.

The method for producing the polishing particles is as follows. First, the rare-earth salt, which is a precursor, for example cerium nitrate, is mixed with ultrapure water to produce a cerium solution. Similarly, yttrium nitrate is mixed with ultrapure water to produce an yttrium solution, and further mixed with the cerium solution to produce a cerium-yttrium mixed solution. Subsequently, the basic solution is produced. Urea or a urea-based compound can be used as the basic compound, and is mixed with ultrapure water for appropriately regulating the concentration to use. Here, as the urea-based compound, dimethylacetylurea, benzenesulfonylurea, trimethylurea, tetraethylurea, tetramethylurea, triphenylurea, tetraphenylurea, etc. can also be used.

An ion concentration in the cerium-yttrium mixed solution is not particularly limited, and can be within a range of 0.01 mol·dm$^{-3}$ to 0.1 mol·dm$^{-3}$. An ion concentration in the basic solution is preferably 20 to 50 times higher than the ion concentration of the cerium-yttrium mixed solution. Setting the ion concentration of the cerium-yttrium mixed solution and the ion concentration of the basic solution within such ranges can produce particles having a uniform particle diameter.

Then, the produced cerium-yttrium mixed solution and basic solution are transferred to a reaction vessel at a predetermined mixing ratio, and then the mixture is stirred to perform a heat treatment at a predetermined temperature. The heat treatment in this time can be performed at a temperature of 100° C. or lower, for example 80° C. or higher and 100° C. or lower. A heat-treatment time can be 1 hour or longer, for example 2 hours to 3 hours. A rate of temperature increase from a normal temperature to the heat-treatment temperature can be 3° C. to 6° C. per minute, preferably a rate of 4° C. per minute.

The heat-treated mixed solution is cooled to a room temperature. With such steps, a mixed liquid in which the cerium-yttrium composite particles having a primary particle diameter of, for example, 300 nm or less are generated is produced.

As described above, about the cerium-yttrium composite particles, the composite amorphous particles of cerium and yttrium having a particle diameter of 20 nm to 300 nm are produced by heating the mixed liquid of the cerium solution, the yttrium solution, and the basic solution at the appropriate rate of temperature increase to be heated at the heat-treatment temperature within the appropriate range. If the rate of temperature increase is low, the synthesized particles are likely to have ununiform shape, resulting in tendency to have a large particle diameter distribution. If the heat-treatment temperature is low, hydrolysis of the urea does not proceed to cause a lower yield.

In particular, the average primary particle diameter of the composite amorphous particles of cerium and yttrium used in the present invention can be regulated to 100 nm or more and 300 nm or less by regulating the reaction time.

In the above method, uniform composite amorphous particles of cerium and yttrium having a desired average primary particle diameter can be obtained by further adding a reaction inhibitor into the composite amorphous particles of cerium and yttrium having an average primary particle diameter of less than 100 nm and regulating the reaction time. As the reaction inhibitor, an alkyldimethylamine oxide compound, a methylmorpholine oxide compound, or the like can be used, for example. The addition amount of the reaction inhibitor is preferably 10 to 200 mol % relative to the amount of the rare-earth ion. The composite amorphous particles of cerium and yttrium having an average primary particle diameter of less than 100 nm produced as above are recovered with a centrifuge and dried, and then heat-treated in the presence of oxygen at a temperature of 400° C. or higher for 1 hour or longer to produce composite oxide particles of cerium and yttrium having an average primary particle diameter of 30 nm or more and 80 nm or less.

The polishing agent for a synthetic quartz glass substrate can be produced by mixing at least: the composite amorphous particles of cerium and yttrium having the average primary particle diameter of 100 nm or more and 300 nm or less; the composite oxide particles of cerium and yttrium having the average primary particle diameter of 30 nm or more and 80 nm or less, produced as above; and water. The above additive, an adjuster for adjusting the pH, etc. can be appropriately added.

(Method for Polishing Synthetic Quartz Glass Substrate)

Next, a method for polishing a synthetic quartz glass substrate using the inventive polishing agent will be described. Since the inventive polishing agent is particularly preferably used in a final polishing step after a rough polishing step, an example of one-side polishing in the final polishing step will be described. However, the present invention is obviously not limited thereto, and the inventive polishing agent can be used for rough polishing. In addition, the inventive polishing agent can be used for not only one-side polishing but also both-side polishing, etc.

A one-side polishing apparatus 10 that can be used for the inventive polishing method can be a one-side polishing apparatus 10 constituted with, for example, a turn table 3 onto which a polishing pat 4 is attached, a polishing-agent feeding mechanism 5, a polishing head 2, etc., as illustrated in FIG. 1. As illustrated in FIG. 1, the polishing head 2 can hold a synthetic quartz glass substrate W, which is a target to be polished, and can rotate on its axis. The turn table 3 can also rotate on its axis.

As the polishing pat 4, a non-woven fibric, a polyurethane foam, a porous resin, etc. can be used, for example. A surface of the polishing pat 4 is preferably always covered by a polishing agent 1 during the polishing. Therefore, the polishing agent 1 is preferably fed continuously by providing a pump, etc. in the polishing-agent feeding mechanism 5.

In such a one-side polishing apparatus 10, the synthetic quartz glass substrate W is held by the polishing head 2 holds, and the inventive polishing agent 1 is fed onto the polishing pat 4 by the polishing-agent feeding mechanism 5. Then, each of the turn table 3 and the polishing head 2 rotates for slide-contacting the surface of the synthetic quartz glass substrate W with the polishing pat 4 to polish the surface. Such a polishing method using the inventive polishing agent can improve the polishing rate and can inhibit defect generation due to the polishing. The inventive polishing method can yield a synthetic quartz glass substrate with remarkably fewer defects, and thereby can be suitably used for the final polishing step.

Specifically, the synthetic quartz glass substrate final-polished with the inventive polishing method can be used for semiconductor-related electronic materials for frontier use. For example, the synthetic quartz glass substrate can be suitably used for photomasks, nano-imprinting, and magnetic devices.

The synthetic quartz glass substrate before the final polishing can be provided by, for example, the following steps. First, a synthetic quartz glass ingot is formed, then the synthetic quartz glass ingot is annealed, and then the synthetic quartz glass ingot is sliced to form a wafer. Thereafter, the sliced wafer is chamfered and wrapped, and subsequently polished for changing the wafer surface into a mirror surface. The synthetic quartz glass substrate thus provided can be subjected to final polishing with the inventive polishing method.

Example

Hereinafter, the present invention will be described specifically with Examples, but the present invention is not limited to the following Examples.

Example 1

An aqueous dispersion of composite oxide particles of cerium and yttrium having an average primary particle diameter of 50 nm and an aqueous dispersion of composite amorphous particles of cerium and yttrium having an average primary particle diameter of 200 nm were mixed so that the mixing ratio on a mass basis of the composite oxide particles of cerium and yttrium to the composite amorphous particles of cerium and yttrium was set to 2 to prepare a polishing agent having a particle concentration in the polishing agent of 40 parts by mass relative to 100 parts by mass of the polishing agent. The values of the average primary particle diameters were the values having been converted with a transmission electron microscope (TEM).

A polishing pat (made of a soft suede, manufactured by FILWEL Co., Ltd.) was attached onto a turn table, and a rough-polished synthetic quartz glass substrate (4 inch: 100 mm in diameter) was set on a substrate-attachable head. With a polishing load of 100 gf/cm$^2$ (10$^4$ Pa), with rotation speeds of the turn table and the head of 50 rpm (min$^{-1}$), and with feeding the above polishing agent for polishing a synthetic quartz glass substrate at 100 ml·min$^{-1}$, 2 μm or more of the substrate, which was an amount sufficient for removing defects generated during the rough polishing step, was polished. After the polishing, the synthetic quartz glass substrate was removed from the head, washed with pure water, then washed with ultrasonic, and then dried with a drying machine at 80° C. A change in a thickness of the synthetic quartz glass substrate before and after the polishing was measured with a reflectance spectroscopic thickness meter (SF-3, manufactured by Otsuka Electronics Co., Ltd.) to determine a polishing rate. A number of defects with 100 nm or larger generated on the polished synthetic glass substrate surface was determined with a laser microscope.

Example 2

An aqueous dispersion of composite oxide particles of cerium and yttrium having an average primary particle diameter of 80 nm and an aqueous dispersion of composite amorphous particles of cerium and yttrium having an average primary particle diameter of 200 nm were mixed so that the mixing ratio on a mass basis of the composite oxide particles of cerium and yttrium to the composite amorphous particles of cerium and yttrium was 1.5 to prepare a polishing agent having a particle concentration in the polishing agent of 40 parts by mass relative to 100 parts by mass of the polishing agent. The values of the average primary particle diameters were the values having been converted with a transmission electron microscope (TEM). The polishing of the synthetic quartz glass substrate and the valuation were performed in the same manner as in Example 1 except for the regulation of the polishing agent.

Example 3

An aqueous dispersion of composite oxide particles of cerium and yttrium having an average primary particle diameter of 30 nm and an aqueous dispersion of composite amorphous particles of cerium and yttrium having an average primary particle diameter of 200 nm were mixed to so that the mixing ratio on a mass basis of the composite oxide particles of cerium and yttrium to the composite amorphous particles of cerium and yttrium was 2 prepare a polishing agent having a particle concentration in the polishing agent of 40 parts by mass relative to 100 parts by mass of the polishing agent. The values of the average primary particle diameters were the values having been converted with a transmission electron microscope (TEM). The polishing of the synthetic quartz glass substrate and the valuation were performed in the same manner as in Example 1 except for the regulation of the polishing agent.

Examples 4 to 6

An aqueous dispersion of composite oxide particles of cerium and yttrium having an average primary particle diameter of 50 nm and an aqueous dispersion liquid of composite amorphous particles of cerium and yttrium each having an average primary particle diameter of 100 nm, 250 nm, or 300 nm were mixed so that the mixing ratio on a mass basis of the composite oxide particles of cerium and yttrium to the composite amorphous particles of cerium and yttrium was 2 to prepare a polishing agent having a particle concentration in the polishing agent of 40 parts by mass relative to 100 parts by mass of the polishing agent. The values of the average primary particle diameters were the values having been converted with a transmission electron microscope (TEM). The polishing of the synthetic quartz glass substrate and the valuation were performed in the same manner as in Example 1 except for the regulation of the polishing agent.

Comparative Examples 1 and 2

An aqueous dispersion of composite oxide particles of cerium and yttrium each having an average primary particle diameter of 20 nm or 90 nm and an aqueous dispersion of composite amorphous particles of cerium and yttrium having an average primary particle diameter of 200 nm were mixed so that the mixing ratio on a mass basis of the composite oxide particles of cerium and yttrium to the composite amorphous particles of cerium and yttrium was 2 to prepare a polishing agent having a particle concentration in the polishing agent of 40 parts by mass relative to 100 parts by mass of the polishing agent. The values of the average primary particle diameters were the values having been converted with a transmission electron microscope (TEM). The polishing of the synthetic quartz glass substrate and the valuation were performed in the same manner as in Example 1 except for the regulation of the polishing agent.

Comparative Examples 3 and 4

An aqueous dispersion of composite oxide particles of cerium and yttrium having an average primary particle diameter of 50 nm and an aqueous dispersion of non-spherical silica particles each having an average primary particle diameter of 90 nm or 310 nm were mixed to prepare a polishing agent having a particle concentration in the polishing agent of 40 parts by mass relative to 100 parts by mass of the polishing agent. The values of the average primary particle diameters were the values having been converted with a transmission electron microscope (TEM). The polishing of the synthetic quartz glass substrate and the valuation were performed in the same manner as in Example 1 except for the regulation of the polishing agent.

Comparative Examples 5

An aqueous dispersion of composite oxide particles of cerium and yttrium having an average primary particle diameter, converted with a transmission electron microscope (TEM), of 50 nm was used to prepare a polishing agent having a particle concentration in the polishing agent of 40 parts by mass relative to 100 parts by mass of the polishing agent. The polishing of the synthetic quartz glass substrate and the valuation were performed in the same manner as in Example 1 except for the regulation of the polishing agent.

Comparative Example 6

An aqueous dispersion liquid of composite amorphous particles of cerium and yttrium having an average primary particle diameter, converted with a transmission electron microscope (TEM), of 200 nm was used to prepare a polishing agent having a particle concentration in the polishing agent of 20 parts by mass relative to 100 parts by mass of the polishing agent. The polishing of the synthetic quartz glass substrate and the valuation were performed in the same manner as in Example 1 except for the regulation of the polishing agent.

Table 1 shows the conditions and results of Examples and Comparative Examples. The numbers in Table are average values of five synthetic quartz glass substrates polished in Examples and Comparative Examples.

TABLE 1

| | Average primary particle diameter of composite oxide particles of cerium and yttrium (nm) | Average primary particle diameter of composite amorphous particles of cerium and yttrium (nm) | Average primary particle diameter of non-spherical silica particle (nm) | Mixing ratio | Concentration of polishing particles in polishing agent (parts by mass) | Polishing rate (μm/h) | Number of defects |
|---|---|---|---|---|---|---|---|
| Example 1 | 50 | 200 | — | 2 | 40 | 3.0 | 1 |
| Example 2 | 80 | 200 | — | 1.5 | 40 | 3.5 | 2 |
| Example 3 | 30 | 200 | — | 2 | 40 | 2.8 | 0 |
| Example 4 | 50 | 100 | — | 2 | 40 | 2.6 | 1 |
| Example 5 | 50 | 250 | — | 2 | 40 | 3.8 | 1 |
| Example 6 | 50 | 300 | — | 2 | 40 | 4.0 | 1 |
| Comparative Example 1 | 20 | 200 | — | 2 | 40 | 1.2 | 0 |
| Comparative Example 2 | 90 | 200 | — | 2 | 40 | 3.5 | 8 |
| Comparative Example 3 | 50 | — | 90 | — | 40 | 1.4 | 1 |
| Comparative Example 4 | 50 | — | 310 | — | 40 | 1.2 | 1 |
| Comparative Example 5 | 50 | — | — | — | 40 | 1.0 | 2 |
| Comparative Example 6 | — | 200 | — | — | 20 | 0.8 | 0 |

Use of the polishing agent regulated in Examples 1 to 6, that is, use of the polishing agent containing the composite oxide particles of cerium and yttrium and the composite amorphous particles of cerium and yttrium having the predetermined average primary particle diameters to polish the synthetic quartz glass substrate was capable of reducing the defect generation due to the polishing. Furthermore, the high polishing rate against the synthetic quartz glass substrate was obtained.

Meanwhile, Comparative Examples 1 to 4, which used the polishing agent containing the composite oxide particles of cerium and yttrium or the composite amorphous particles of cerium and yttrium not having the average primary particle diameter specified in the present invention, exhibited more defects or lower polishing rate, which were poor results compared with Examples. Comparative Example 5, which contained no composite amorphous particles of cerium and yttrium, and Comparative Example 6, which contained no composite oxide particles of cerium and yttrium, exhibited poor results compared with Examples.

As described above, it has been found that polishing the synthetic quartz glass substrate with the inventive polishing agent for a synthetic quartz glass substrate can yield a high polishing rate against the synthetic quartz glass substrate and can achieve the polished surface of the synthetic quartz glass substrate with reduced defects.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A polishing agent for a synthetic quartz glass substrate, the polishing agent comprising at least:
    polishing particles; and
    water,
    wherein the polishing particles contain: composite oxide particles of cerium and yttrium; and composite amorphous particles of cerium and yttrium, and
    the composite oxide particles of cerium and yttrium have an average primary particle diameter of 30 nm or more and 80 nm or less, and the composite amorphous particles of cerium and yttrium have an average primary particle diameter of 100 nm or more and 300 nm or less.

2. The polishing agent for a synthetic quartz glass substrate according to claim 1, wherein a mixing ratio on a mass basis between the composite oxide particles of cerium and yttrium and the composite amorphous particles of cerium and yttrium in the polishing agent is 1.5 or more and 3.0 or less, the mixing ratio on a mass basis being (a mass of the composite oxide particles of cerium and yttrium)/(a mass of the composite amorphous particles of cerium and yttrium).

3. A method for producing the polishing agent for a synthetic quartz glass substrate according to claim 1, the method comprising:
    a step of producing the composite amorphous particles of cerium and yttrium having an average primary particle diameter of 100 nm or more and 300 nm or less by using at least: a cerium-containing salt and an yttrium-containing salt; and a basic compound at an excess amount relative to the cerium-containing salt and the yttrium-containing salt according to a wet precipitation method for obtaining the composite amorphous particles of cerium and yttrium;
    a step of producing the composite oxide particles of cerium and yttrium having an average primary particle diameter of 30 nm or more and 80 nm or less by oxidatively treating the composite amorphous particles of cerium and yttrium having an average primary particle diameter of less than 100 nm for obtaining the composite oxide particles of cerium and yttrium; and
    a step of producing the polishing agent for a synthetic quartz glass substrate by mixing: at least the composite amorphous particles of cerium and yttrium having the average primary particle diameter of 100 nm or more and 300 nm or less; the composite oxide particles of cerium and yttrium having the average primary particle diameter of 30 nm or more and 80 nm or less; and water.

4. A method for producing the polishing agent for a synthetic quartz glass substrate according to claim 2, the method comprising:
    a step of producing the composite amorphous particles of cerium and yttrium having an average primary particle diameter of 100 nm or more and 300 nm or less by using at least: a cerium-containing salt and an yttrium-containing salt; and a basic compound at an excess amount relative to the cerium-containing salt and the yttrium-containing salt according to a wet precipitation method for obtaining the composite amorphous particles of cerium and yttrium;
    a step of producing the composite oxide particles of cerium and yttrium having an average primary particle diameter of 30 nm or more and 80 nm or less by oxidatively treating the composite amorphous particles of cerium and yttrium having an average primary particle diameter of less than 100 nm for obtaining the composite oxide particles of cerium and yttrium; and
    a step of producing the polishing agent for a synthetic quartz glass substrate by mixing: at least the composite amorphous particles of cerium and yttrium having the average primary particle diameter of 100 nm or more and 300 nm or less; the composite oxide particles of cerium and yttrium having the average primary particle diameter of 30 nm or more and 80 nm or less; and water.

5. The method according to claim 3 for producing the polishing agent for a synthetic quartz glass substrate, wherein
    a nitrate salt of cerium and a nitrate salt of yttrium are used as the cerium-containing salt and the yttrium-containing salt, and
    urea or a urea-containing compound is used as the basic compound.

6. The method according to claim 4 for producing the polishing agent for a synthetic quartz glass substrate, wherein
    a nitrate salt of cerium and a nitrate salt of yttrium are used as the cerium-containing salt and the yttrium-containing salt, and
    urea or a urea-containing compound is used as the basic compound.

7. A method for polishing a synthetic quartz glass substrate, comprising:
    a rough polishing step; and
    a final polishing step after the rough polishing step, wherein
    in the final polishing step, a final polishing is performed by using the polishing agent for a synthetic quartz glass substrate according to claim 6.

8. A method for polishing a synthetic quartz glass substrate, comprising:
a rough polishing step; and
a final polishing step after the rough polishing step, wherein
in the final polishing step, a final polishing is performed by using the polishing agent for a synthetic quartz glass substrate according to claim 7.

\* \* \* \* \*